(12) United States Patent
Fukunaga et al.

(10) Patent No.: US 6,959,544 B2
(45) Date of Patent: Nov. 1, 2005

(54) TORQUE CONVERTER

(75) Inventors: Takao Fukunaga, Yawata (JP);
Yukiyoshi Takada, Katano (JP); Kozo Mori, Osaka (JP)

(73) Assignee: Exedy Corporation, Osaka (JP)

( * ) Notice: Subject to any disclaimer, the term of this patent is extended or adjusted under 35 U.S.C. 154(b) by 29 days.

(21) Appl. No.: 10/740,595

(22) Filed: Dec. 22, 2003

(65) Prior Publication Data
US 2004/0128992 A1    Jul. 8, 2004

(30) Foreign Application Priority Data
Dec. 26, 2002  (JP) .............................. 2002-377667

(51) Int. Cl.⁷ .............................................. F16H 41/24
(52) U.S. Cl. ......................................................... 60/330
(58) Field of Search ................................. 60/330, 361

(56) References Cited

U.S. PATENT DOCUMENTS 6,464,054 B2 * 10/2002 Fukunaga et al. ......... 192/3.29
6,575,276 B2 * 6/2003 Fukunaga et al. ......... 192/3.29
6,729,453 B2 * 5/2004 Uehara ........................ 192/3.3

FOREIGN PATENT DOCUMENTS

| JP | 04-290657 A | 10/1992 |
| JP | 08-210461 A | 8/1996 |
| JP | 08-312748 A | 11/1996 |
| JP | 200-074174 A | 3/2000 |

* cited by examiner

Primary Examiner—Thomas E. Lazo
(74) Attorney, Agent, or Firm—Shinjyu Global IP Counselors, LLP

(57) ABSTRACT

An impeller, a turbine, and a stator form a torus of a torque converter. A elliptic ratio L/H of an axial length L of the torus to a radial height H of the torus is 0.72 or smaller. A diameter ratio (D2/D1) of an inner diameter D2 of the torus to an outer diameter D1 of the torus is 0.45 or greater. The impeller includes an impeller core, and an impeller axial length ratio (Lp/D1) of an axial length Lp of the impeller core to the outer diameter D1 of the torus is in a range between 0.030 to 0.045. The turbine includes a turbine core, and an turbine axial length ratio (Lt/D1) of an axial length Lt of the turbine core to the outer diameter D1 of the torus is in a range between 0.021 to 0.029.

5 Claims, 1 Drawing Sheet

TORQUE CONVERTER

BACKGROUND OF THE INVENTION

1. Field of the Invention

The present invention relates to a torque converter, and more particularly to a elliptic torque converter in which the axial length of the torus has been shortened.

2. Background Information

A torque converter is a device that includes a torus having three types of vane wheels (an impeller, a turbine, and a stator), and transmits power by means of a fluid inside the torus. Among these types of torque converters, there are those in which the ellipse of the torus has been reduced in the axial direction. By changing the torus to an elliptical shape, the axial length of the entire torque converter will be shortened, and thus the torque converter can be placed inside a space that is limited in the axial direction.

In addition, a lockup device is provided in a space in the torque converter between the front cover and the torus. The lockup device serves to mechanically transmit the torque of the front cover to the transmission side. The lockup device includes a clutch connecting portion and a damper mechanism. The clutch connecting portion is designed so that it couples with or releases from the front cover in accordance with changes in the hydraulic pressure within the torque converter. The damper mechanism includes, for example, a plurality of torsion springs. The torsion springs function to absorb and dampen vibrations in the torsion direction when the lockup device is in the engaged state.

Plates which include a plurality of friction surfaces continue to be added to the lockup device in accordance with recent increases in engine torque.

In addition, torque converters which transmit torque by means of a fluid only when the vehicle is started, and in which the lockup device is connected at a speed of 10 km per hour or higher, for example, have recently been disclosed in the prior art. With a structure like this in which the lockup region is enlarged, it is desirable to improve the performance of the torsion springs in order to sufficiently absorb and dampen torsional vibrations in response to changes in the torque from the engine.

Thus, it will be necessary to increase the length of the lockup device in the axial direction in order to add plates thereto and to improve the capabilities of the torsion spring.

In view of the above, there exists a need for a torque converter which overcomes the above mentioned problems in the prior art. This invention addresses this need in the prior art as well as other needs, which will become apparent to those skilled in the art from this disclosure.

SUMMARY OF THE INVENTION

An object of the present invention is to either maintain or improve the present torque converter performance, and shorten the axial length of the entire torque converter.

Another object of the present invention is to obtain superior performance in a torque converter disposed in a space limited in the axial direction by regulating the sizes and/or positions of each component thereof.

According to a first aspect of the present invention, a torque converter serves to transmit torque from an engine to a transmission by means of a fluid, and includes a front cover, an impeller, a turbine, and a stator. The front cover is disposed on the engine side of the torque converter, and torque from the engine is input thereto. The impeller is disposed on the transmission side of the front cover, forms a fluid chamber with the front cover, and has a plurality of blades arranged on the inner side thereof. The turbine is disposed on the engine side of the impeller inside the fluid chamber, has a plurality of blades arranged on the side thereof that faces the impeller, and is capable of outputting torque to the transmission side. The stator is disposed between the impeller and the inner peripheral portion of the turbine, and serves to rectify the flow of fluid that flows from the turbine to the impeller. The impeller, turbine, and stator form a torus. A flatness ratio L/H of the axial length L of the torus to the radial height H of the torus is 0.72 or smaller. A diameter ratio (D2/D1) of an inner diameter D2 of the torus to an outer diameter D1 of the torus is 0.45 or greater. The impeller include an impeller core, and the impeller axial length ratio (Lp/D1) of the axial length Lp of the impeller core to the outer diameter D1 of the torus is in a range between 0.030 to 0.045. The turbine includes a turbine core, and the turbine axial length ratio (Lt/D1) of the axial length Lt of the turbine core to the outer diameter D1 of the torus is in a range between 0.021 to 0.029.

With the torque converter disclosed in claim 1, the torus can be further flattened when the elliptic ratio (L/H) of the torus is 0.72 or smaller.

Furthermore, if the impeller axial length (Lp/D1) is larger than the turbine axial length (Lt/D1), the turbine axial length will be shorter than the impeller axial length. This, the axial length of the torus will be further shortened compared to that of the prior art. As a result, the axial length of the entire torque converter will be shortened, or the space in which the lockup device, for example, is disposed in a torque converter disposed inside a predetermined axial length can be enlarged in the axial direction.

According to another aspect of the present invention, the diameter ratio (D4/D3) of an inner diameter D4 to an outer diameter D3 of the impeller core and the turbine core is in a range between 0.79 and 0.83.

With this torque converter, the ability of the fluid in the stator to transmit movement will not be reduced and high performance will be achieved because the fluid path area of the stator is larger than the fluid path area of the discharge port of the impeller and the intake port of the turbine.

According to another aspect of the present invention, the relationship between a fluid path area A1 of the discharge port of the impeller and the intake port of the turbine, and the fluid path area A2 of the stator, satisfy the condition $0<(A2-A1)/[(\pi/4)D1^2]<0.02$.

With this torque converter, the ability of the fluid in the stator to transmit movement will not be reduced and high performance will be achieved because the fluid path area A2 of the stator is larger than the fluid path area A1 of the discharge port of the impeller and the intake port of the turbine.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawing which form a part of this original disclosure:

DETAILED DESCRIPTION OF THE PREFERRED EMBODIMENTS (1) Basic Structure of the Torque Converter FIG. 1 shows a vertical cross section of a torque converter 1 to which an embodiment of the present invention is applied. The torque converter 1 serves to transmit torque from an engine crankshaft (not shown in the FIGURE) to a transmission input shaft (not shown in the FIGURE). The engine (not shown) is arranged on the left side of FIG. 1 and the transmission (not shown) is arranged on the right side of FIG. 1. The line O—O shown in FIG. 1 is the centerline of the rotation of the torque converter 1.

Figure 1:
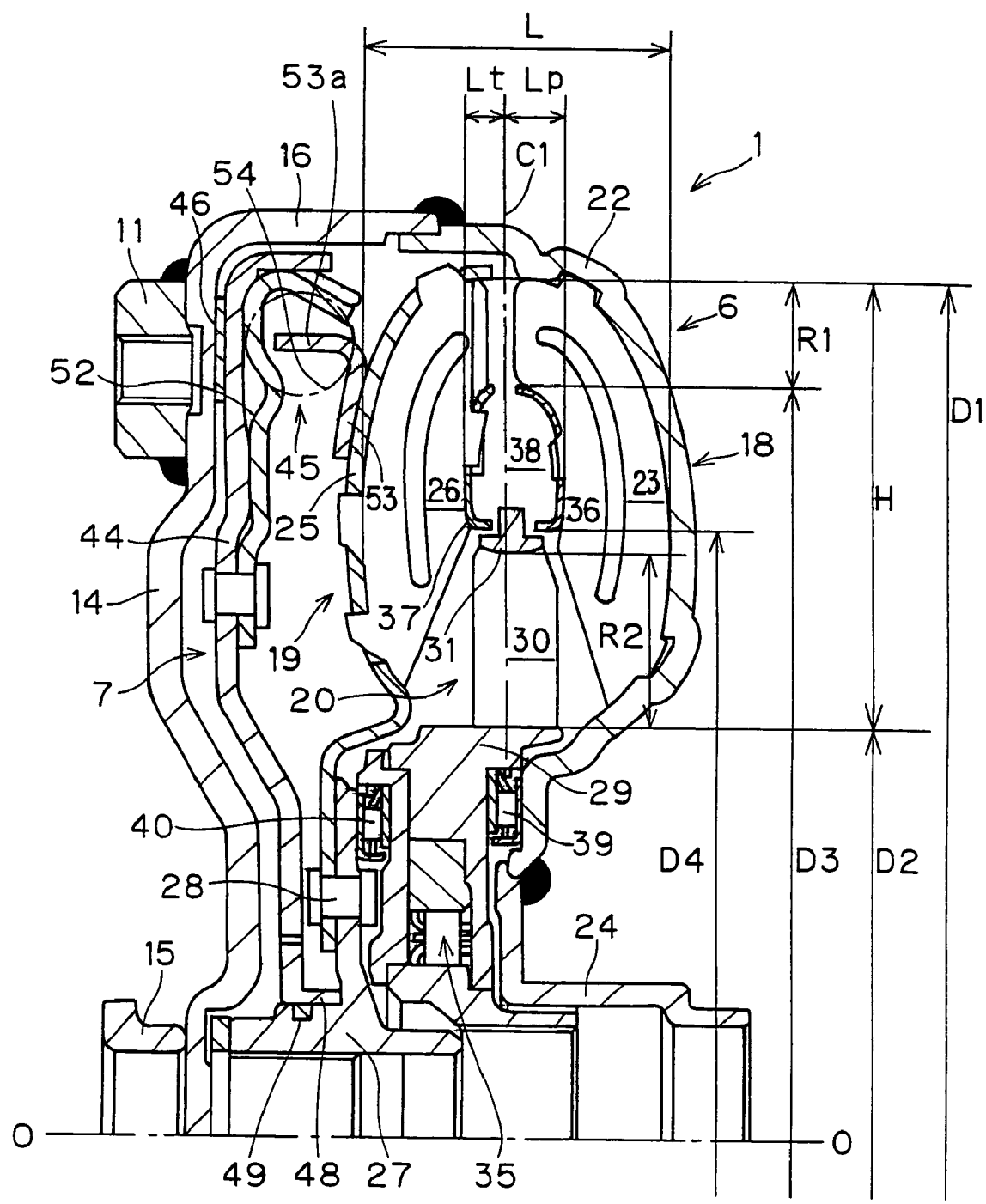
FIG. 1 is a vertical cross-section of a torque converter according to an embodiment of the present invention.

The torque converter 1 includes a torus 6 having three types of vane wheels (an impeller 18, a turbine 19, and a stator 20), and a lockup device 7.

A front cover 14 is a circular disk-shaped member which is disposed near the tip of the engine crankshaft. A center boss 15 is welded to the inner circumferential part of front cover 14. A plurality of nuts 11 are fixed to the outer peripheral and engine side of the front cover 11 and are equally spaced apart in the circumferential direction.

An outer peripheral cylindrical portion 16 is formed on the outer periphery of the front cover 14 and extends in the axial direction toward the transmission side. The outer circumferential rim of an impeller shell 22 of the impeller 18 is fixed to an end of the outer peripheral cylindrical portion 16 by welding. As a result, the front cover 14 and the impeller 18 together form a fluid chamber which is to be filled with hydraulic oil (fluid). The impeller 18 primarily includes the impeller shell 22, a plurality of impeller blades 23 that are fixed to the inner side of the impeller shell 22, and an impeller hub 24 that is fixed to the inner peripheral portion of the impeller shell 22.

A turbine 19 is disposed inside the fluid chamber so as to face the impeller 18 in the axial direction. The turbine 19 primarily includes a turbine shell 25, and a plurality of turbine blades 26 fixed to the surface of turbine shell 25 on the impeller side. The inner peripheral portion of the turbine shell 25 is fixed to a flange of a turbine hub 27 by means of a plurality of rivets 28.

The turbine hub 27 is connected to an input shaft (not shown in the figure) and incapable of relative rotation therewith.

The stator 20 is a mechanism that serves to rectify the flow of the hydraulic oil that returns from the turbine 19 to the impeller 18. The stator 20 is single-piece member made of a cast resin or a cast aluminum alloy. The stator 20 is disposed between an inner peripheral portion of the impeller 18 and an inner peripheral portion of the turbine 19. The stator 20 primarily includes an annular carrier 29, a plurality of stator blades 30 that are arranged on the outer peripheral surface of the carrier 29, and an annular core 31 that is fixed to the ends of the plurality of stator blades 30. The carrier 29 is supported by a fixed shaft (not shown in the figure) via a one-way clutch 35.

An annular impeller core 36 is fixed to the inner sides of the plurality of impeller blades 23. A central portion of the circle of impeller blades 23 is crescent shaped, and the impeller core 36 has a cross-sectional shape that matches this crescent shape. An annular turbine core 37 is fixed to the inner sides of the plurality of turbine blades 26. A central portion of the circle of turbine blades 26 is crescent shaped, and the turbine core 37 has a cross-sectional shape that matches this crescent shape.

The cores 31, 36, 37 form the inner sides of a fluid path inside the torus 6 (the inner core of the torus). A space 38 on the inner sides of the cores 31, 36, 37 is a cavity portion which is filled with fluid, and is a space that does not contribute to the transmission of power.

A thrust bearing 39 is disposed between the carrier 29 and the impeller hub 24. A thrust bearing 40 is disposed between the carrier 29 and the turbine hub 27.

(2) The Relationship Between the Dimensions of Each Structure of the Torque Converter The length in the axial direction of this torque converter 1 is considerably shorter than that of a conventional torque converter. More specifically, the elliptic ratio L/H of the axial length L of the torus 6 to the radial height H of the torus 6 is 0.72 or smaller. Note that the axial length L of the torus 6 is the distance between the portion of the inner side of the impeller 22 furthest toward the transmission side and the portion of the inner side of the turbine shell 25 furthest toward the engine side. Note also that the radial height H of the torus 6 is the distance between the outer peripheral surface of the carrier 29 and the surface on the inner side of the impeller 22 or the turbine shell 25 furthest toward the outer side in the radial direction.

The axial length of the turbine 19 is smaller than that of the impeller 18. In other words, the impeller 18 and the turbine 19 of the torus 6 are not symmetrical in the axial direction.

The axial length of the turbine core 37 is shorter than that of the impeller core 36. More specifically, the impeller axial length ratio (Lp/D1) of the axial length Lp of the impeller core 36 to the outer diameter D1 of the torus 6 is in a range between 0.030 to 0.045. The turbine axial length ratio (Lt/D1) of the axial length Lt of the turbine core 37 to the outer diameter D1 of the torus 6 is in a range between 0.021 to 0.029. Note that the axial length ratio Lp of the impeller core 36 is the distance from a central position C1 in the axial direction (the intermediate position between the end surfaces of the impeller blades 23 and the turbine blades 26) between the discharge port of the impeller 18 and the intake port of the turbine 19, to the furthest portion on the transmission side of the fluid path side of the impeller core 36. The axial length Lt of the turbine core 37 is the distance from the central portion C1 in the axial direction to the furthest portion on the engine side of the fluid path side of the turbine core 37.

In the elliptical torque converter 1 described above, the overall axial length of the torque converter 1 can be further reduced by further shortening the axial length of the turbine 19 to make the torque converter 1 asymmetric.

The diameter ratio (D2/D1) of an inner diameter D2 to an outer diameter D1 of the torus 6 is 0.45 or greater. The diameter ratio (D4/D3) of an inner diameter D4 to an outer diameter D3 of the impeller core 36 and the turbine core 37 is in range between 0.79 and 0.83. The relationship between the fluid path area A1 (the length R1 in the radial direction) of the discharge port of the impeller 18 and the intake port of the turbine 19, and the fluid path area A2 of the stator 20 (the length R2 in the radial direction), satisfy the condition $0 < (A2-A1)/[(\pi/4) D1^2] < 0.02$.

Thus, because the fluid path area A2 of the stator 20 is larger than the fluid path area A1 of the discharge port of the impeller 18 and the intake port of the turbine 19, and the aforementioned condition is satisfied, the ability of the fluid in the stator 20 to transmit movement will not be reduced and high performance will be achieved.

(4) Lockup Device

Next, the lockup device 7 will be described. The lockup device 7 primarily includes a piston member 44 and a damper mechanism 45.

The piston member 44 is disk-shaped member that is disposed near the engine side in the axial direction of the front cover 14. An inner peripheral cylindrical portion 48 that extends in the axial direction toward the transmission side is formed on an inner peripheral portion of the piston member 44. The inner peripheral cylindrical portion 48 is supported by the outer peripheral surface of the turbine hub 27 so as to be capable of relative movement in the rotational and axial directions. Note that the end portion in the axial direction of the inner peripheral cylindrical portion 48 on the transmission side contacts with the flange portion of the turbine hub 27, and movement in the axial direction toward the transmission side is limited thereby up to a predetermined position. A seal ring 49 is disposed on the outer peripheral surface of the turbine hub 27, and seals the space between the outer peripheral surface of the turbine hub 27 and the inner peripheral portion of the piston member 44.

The outer peripheral portion of the piston member 44 functions as a clutch connecting portion. An annular friction facing 46 is fixed to the engine side of the outer peripheral portion of the piston member 44. The friction facing 46 faces an annular and flat friction surface that is formed on the inner side surface of the outer peripheral portion of the front cover 14.

The damper mechanism 45 includes a retaining plate 52, a driven plate 53, and a plurality of torsion springs 54. The retaining plate 52 fits onto the outer peripheral portion of the piston member 44 on the turbine 19 side. The retaining plate 52 includes cut and raised portions that serve to accommodate and support the torsion springs 54. The plurality of torsion springs 54 are coil springs that extend in the circumferential direction, are accommodated inside the retaining plate 52, and both ends of each are supported in the circumferential direction by the retaining plate 52. The driven plate 53 is an annular plate made of sheet metal that is fixed to the outer peripheral side of the turbine shell 25 of the turbine 19. The driven plate 53 extends toward the front cover 14 side, and includes projections 53a that engage with both ends of each of the torsion springs 54 in the circumferential direction.

(5) Operation

Torque is transmitted from the crankshaft of the engine (not shown in the figure) to the front cover 14 and the impeller 18. The hydraulic fluid driven by the impeller blades 23 of the impeller 18 causes the turbine 19 to rotate. The torque of the turbine 19 is output to the input shaft (not shown in the figure) via the turbine hub 27. The hydraulic fluid that flows from the turbine 19 to the impeller 18 passes through the path determined by the carrier 29 of the stator 20 and the core 31 and flows toward the impeller 18 side.

When the hydraulic fluid in the space between the front cover 14 and the piston member 44 flows from the inner peripheral side, the piston member 44 moves toward the front cover 14 due to the difference in oil pressure, and the friction facing 46 is pushed toward the friction surface of the front cover 14. As a result, torque is transmitted from the front cover 14 to the turbine hub 27 via the lockup device 7.

(6) Other Embodiments

The invention is not restricted to the foregoing embodiment, and can be variously modified or changed without departing from the scope of the invention.

For example, the structure of the lockup device is not limited by aforementioned embodiment.

Any terms of degree used herein, such as "substantially", "about" and "approximately", mean a reasonable amount of deviation of the modified term such that the end result is not significantly changed. These terms should be construed as including a deviation of at least ±5% of the modified term if this deviation would not negate the meaning of the word it modifies.

This application claims priority to Japanese Patent Application No. 2002-377667. The entire disclosure of Japanese Patent Application No. 2002-377667 is hereby incorporated herein by reference.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing description of the embodiments according to the present invention are provided for illustration only, and not for the purpose of limiting the invention as defined by the appended claims and their equivalents.

What is claimed is:

1. A torque converter that serves to transmit torque from an engine to a transmission by means of a fluid, the torque converter comprising:

a front cover being disposed on an engine side of the torque converter to which torque from the engine is input;

an impeller being disposed on the transmission side of the front cover, the impeller forming a fluid chamber with the front cover, and having a plurality of blades arranged on the inner side thereof;

a turbine being disposed on the engine side of the impeller inside the fluid chamber, the turbine having a plurality of blades being arranged on the side thereof facing the impeller, and being capable of outputting torque to the transmission side; and a stator being disposed between the impeller and the inner peripheral portion of the turbine, the stator serving to rectify the flow of fluid that flows from the turbine to the impeller, the impeller, turbine, and stator forming a torus, a elliptic ratio L/H of an axial length L of the torus to a radial height H of the torus being 0.72 or smaller, a diameter ratio (D2/D1) of an inner diameter D2 to an outer diameter D1 of the torus being 0.45 or greater, the impeller including an impeller core, and an axial length ratio (Lp/D1) of an axial length Lp of the impeller core to an outer diameter D1 of the torus being in a range between 0.030 to 0.045, and the turbine including a turbine core, and a turbine axial length ratio (Lt/D1) of an axial length Lt of the turbine core to the outer diameter D1 of the torus being in a range between 0.021 to 0.029.

2. The torque converter set forth in claim 1, wherein a diameter ratio (D4/D3) of an inner diameter D4 to an outer diameter D3 of the impeller core and the turbine core is in range between 0.79 and 0.83.

3. The torque converter set forth in claim 2, wherein the relationship between a fluid path area A1 of a discharge port of the impeller and an intake port of the turbine, and a fluid path area A2 of the stator, satisfy the condition $0<(A2-A1)/[(\pi/4)D1^2]<0.02$.

4. The torque converter set forth in claim 1, wherein the relationship between a fluid path area A1 of a discharge port of the impeller and an intake port of the turbine, and a fluid path area A2 of the stator, satisfy the condition $0<(A2-A1)/[(\pi/4)D1^2]<0.02$.

5. The torque converter set forth in claim 1, wherein an axial length of the turbine is smaller than an axial length of the impeller.

* * * * *